US011585723B2

United States Patent
Icenogle et al.

(10) Patent No.: US 11,585,723 B2
(45) Date of Patent: Feb. 21, 2023

(54) CUVETTE FOR OPTICAL LENS ANALYSES

(71) Applicant: Alcon Inc., Fribourg (CH)

(72) Inventors: David Andrew Icenogle, Brookhaven, GA (US); Yeming Gu, Suwanee, GA (US); Yan Wang, Suwanee, GA (US)

(73) Assignee: Alcon Inc., Fribourg (CH)

( * ) Notice: Subject to any disclaimer, the term of this patent is extended or adjusted under 35 U.S.C. 154(b) by 177 days.

(21) Appl. No.: 17/122,071

(22) Filed: Dec. 15, 2020

(65) Prior Publication Data
US 2021/0190630 A1 Jun. 24, 2021

Related U.S. Application Data

(60) Provisional application No. 62/949,752, filed on Dec. 18, 2019.

(51) Int. Cl.
*G01M 11/02* (2006.01)
*G02B 1/04* (2006.01)
*G01N 21/03* (2006.01)

(52) U.S. Cl.
CPC ..... *G01M 11/0214* (2013.01); *G01N 21/0303* (2013.01); *G02B 1/043* (2013.01); *G01N 2021/0339* (2013.01)

(58) Field of Classification Search
CPC .......... G01M 11/0214; G01N 21/0303; G01N 2021/0339; G02B 1/043
See application file for complete search history.

(56) References Cited

U.S. PATENT DOCUMENTS

| 6,047,082 | A | * | 4/2000 | Rhody | G01M 11/0214 |
| | | | | | 382/141 |
| 6,765,661 | B2 | * | 7/2004 | Biel | G01N 21/958 |
| | | | | | 356/124 |
| 8,427,636 | B2 | * | 4/2013 | Prince | G01N 35/025 |
| | | | | | 356/246 |
| 2007/0075281 | A1 | * | 4/2007 | Gunning | G01N 21/03 |
| | | | | | 250/573 |
| 2015/0198521 | A1 | | 7/2015 | Moldt | |
| 2019/0257742 | A1 | * | 8/2019 | Scheeline | G01J 3/18 |
| 2020/0240902 | A1 | * | 7/2020 | Hassell | G01N 21/05 |

FOREIGN PATENT DOCUMENTS

| EP | 1032812 | A2 | | 9/2000 | |
| GB | 2069172 | | * | 8/1981 | G01B 11/00 |

* cited by examiner

*Primary Examiner* — Michael P LaPage
(74) *Attorney, Agent, or Firm* — Sheng-Hsin Hu

(57) ABSTRACT

A cuvette with at least one side having materials with thermal conductivity of at least 5 W/m-K, such as sapphire, for holding contact lenses or intra-ocular lenses during optical measurements. The cuvette may further include a backstop to ensure consistent measurements and a pedestal to minimize optical measurement variations.

14 Claims, 4 Drawing Sheets

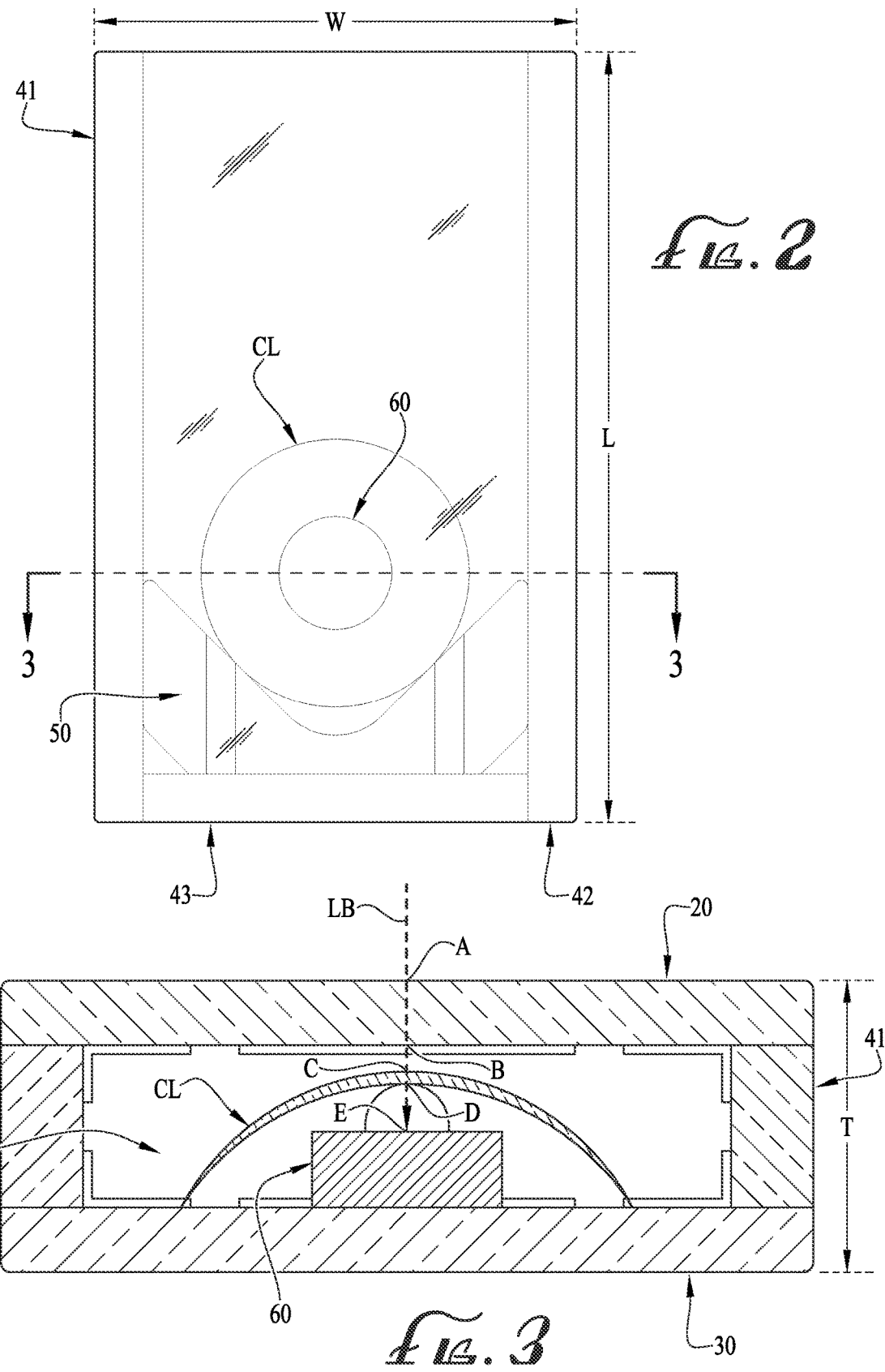

CUVETTE FOR OPTICAL LENS ANALYSES

TECHNICAL FIELD

The present invention relates generally to the field of cuvettes for optical analyses, and more particularly to cuvettes comprising at least one side having materials with thermal conductivity of 5 W/m-K or above.

BACKGROUND

Cuvettes are commonly used to hold contact lenses or intra-ocular lenses during optical measurements. Such cuvettes are used, for example, to measure the group index (GI) and refractive index (RI) which are highly sensitive to changes in temperature and require stabilization of the lens and the surrounding solution before accurate measurements can be taken. Equilibrium time for GI/RI measurements using an optical thickness gauge, for example, requires a very uniform and tight (±0.01° C.) range during measurements to meet variability requirements. However, measurements using cuvettes made from conventional optical materials, such as glass and fused silica, can require at least four minutes for the lens and solution temperatures to stabilize. When a large number of lenses must be measured, such processes can cause increased delays and/or decreased productivity. Accordingly, it can be seen that needs exist for improvements in cuvettes to provide for faster temperature stabilization. It is to the provision of solutions meeting these and other needs that the present invention is primarily directed.

SUMMARY

Generally described, the present invention relates to a cuvette for optical analyses of contact lenses and intra-ocular lenses. In example embodiments, the present invention provides a cuvette with at least one side comprising, consisting essentially of, and/or consisting of optically clear material with at least 5 W/m-K of thermal conductivity. Alternatively, the cuvette includes at least one side comprising, consisting essentially of, and/or consisting of optically clear material with at least 5 W/m-K of thermal conductivity and at least 85% optical transparency. In some embodiments, the cuvette optionally includes a backstop to assist in the placement of the contact lens or intra-ocular lens. In other embodiments, the cuvette optionally also includes a pedestal to displace some amount of solution within the cuvette during measurements. The reduced amount solution within the cuvette and higher thermal conductivity materials used in its construction can promote faster stabilization of the internal temperature and less time required for each measurement.

In another aspect, the invention relates to a cuvette including a unitary midsection with an integrated backstop. In yet another aspect, the invention relates to a cuvette having a unitary body frame made from non-optical, opaque material with openings configured for optically clear window inserts. In example embodiments, the unitary, opaque body frame may be constructed at least partially of a material having thermal conductivity of at least 5 W/m-K.

These and other aspects, features and advantages of the invention will be understood with reference to the drawing figures and detailed description herein and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 2 is a top plan view of the cuvette of FIG. 1.

FIG. 3 shows a detailed cross-section of the cuvette of FIG. 2 along the line 3-3 in the direction of the arrows.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
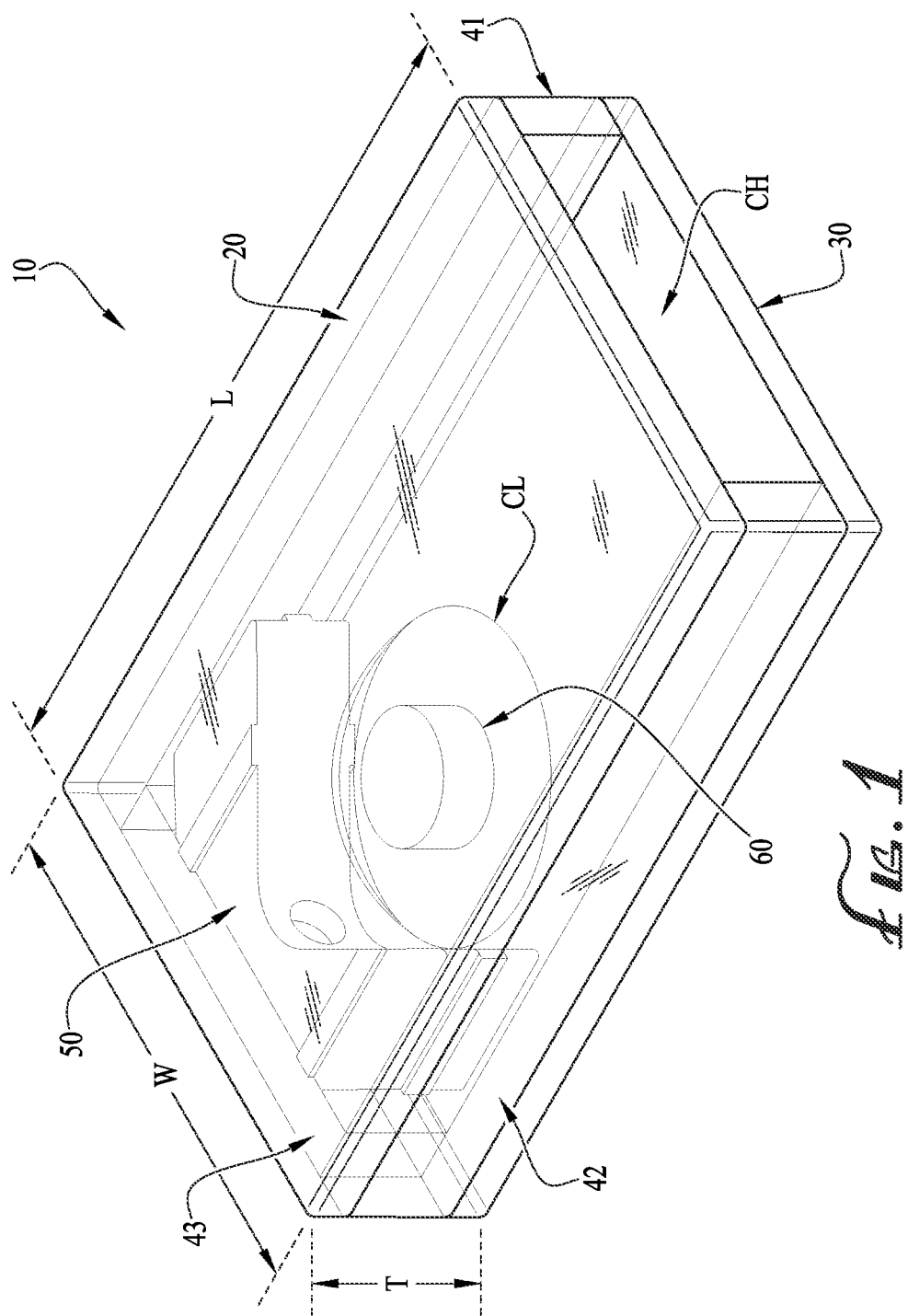
FIG. 1 is a perspective view of a cuvette according to an example embodiment of the present invention.

With reference now to the drawing figures, wherein like reference numbers represent corresponding parts throughout the several views, FIGS. 1 and 2 show an optical cuvette 10 for holding or retaining a contact lens CL or intra-ocular lens (IOL) for conducting optical analyses, according to an example embodiment of the present invention. The cuvette 10 includes a top window or panel 20, a bottom window or panel 30, a first side wall 41, a second side wall 42 and a third side wall 43. The first, second and third sides 41, 42, 43 are generally bonded or fused to the periphery between the top and bottom windows 20, 30, or alternatively may be integrally formed as a unitary component, forming a hollow interior pocket, chamber or compartment therebetween. An opening is provided opposite the third peripheral wall 43 for inserting and removing the contact lens into the interior compartment. Overall dimensions of the cuvette may vary depending on the dimensions of the lens to be measured. In example embodiments, the cuvette comprises an exterior width W of about 25 mm, a length L of about 40 mm and a height or thickness T of about 9 mm. The internal cavity or chamber CH has an internal width of about 20 mm and an internal height of about 5 mm. In some embodiments, the chamber may be dimensioned according to the dimensions of the lens to be tested or measured. The opening may also comprise similar dimensions or dimensions different than those of the internal cavity leading to a narrowed or enlarged opening.

The top and/or bottom windows 20, 30 may be formed in whole or in part from one or more materials with a thermal conductivity of at least 5 W/m-K and optical transparency of at least 85%. According to example embodiments, windows 20 and 30 at least partially or entirely comprise, consist essentially of, or consist of a synthetic or natural sapphire (aluminium oxide, $Al_2O_3$) or sapphire-based material, for example a synthetic sapphire or sapphire glass manufactured by the Verneuil, Kyropoulos, Czochralski or other processes. In alternate embodiments, other materials with thermal conductivities of at least 5 W/m-K and optical transparency of at least 85%, and preferably thermal conductivity between 5 W/m-K and 42 W/m-K and at least 85% optical transparency at about 0.5-2 µm wavelengths, may be considered—including but not limited to magnesium fluoride, barium fluoride, calcium fluoride, lanthanum fluoride, lithium fluoride, magnesium oxide, potassium chloride, quartz crystal, yttrium aluminum garnet, rubidium chloride, rubidium iodide and rubidium bromide. The top and/or bottom windows may also include optical zones with characteristics meeting further requirements of intended testing protocols, such as for example exterior and interior surface parallelism, flatness and roughness, providing preferable conditions for accurate measurements. According to example embodiments, optical zones of top and/or bottom windows require exterior and interior surface parallelism of no more than 10 arc-seconds, flatness of L/4-L/10 at 0.633 µm and peak-to-valley roughness of no more than 10 nm. Optical zones may encompass the entirety of the top and/or bottom windows or encompass only portions of the windows to be aligned with the contact lens during measurements. In alternative embodiments, the top window may be made of sapphire while the bottom window is made from another suitable material, such as glass or fused silica, or vice versa.

In example embodiments, the side walls 41, 42, and 43 may optionally be constructed from materials different from the top and bottom windows 20, 30. For example, whereas the top and bottom windows may be manufactured from sapphire, the side walls may be constructed from other materials suitable for effectively bonding or fusing to the top and bottom windows. According to example embodiments, the top and bottom panels 20, 30 may be formed from sapphire while the side walls 41, 42, and 43 is formed from, for example, glass or fused silica. The side walls may also be frosted, opaque or optically clear. Alternatively, in other example embodiments, the entire cuvette 10 can be constructed of the same material, either as an assembly of separately formed components, or as an integrally formed unitary body.

In example embodiments, the cuvette 10 may optionally further include a V-block or backstop 50 configured to provide a stop position or contact surface and assist in positioning the contact lens properly and consistently within the cuvette. According to example embodiments, the backstop 50 is a separate component comprising a V-shaped or chevron-like profile positioned adjacent to or against the interior surface of the third side wall 43. The angled surfaces of the backstop converge at the center of the cuvette 10, optionally defining a radiused or rounded interior corner, and are configured to accept or brace the contact lens CL between the angled surfaces ensuring that the contact lens is positioned consistently at the center of the cuvette along its width W, as shown in FIG. 2. In example embodiments, the angle between the angled surfaces is 90°; however, the angle between the surfaces may be 90°-120° in other example embodiments. In other embodiments, other profiles or configurations for the backstop may also be considered, such as for example a linear wall with a central opening or a backstop with an at least partially circular impression. V-block 50 may further include apertures or grooves designed to assist in or ease its installation and removal from the cuvette cavity. In example embodiments, the backstop is made of Delrin or other similar plastics to prevent scratches when the backstop is moved within the cuvette. In some example embodiments, the backstop 50 may be integrated into at least one of the cuvette widows or sides and comprise the same material as the window or side to which the backstop is connected. In other example embodiments, the backstop 50 may integrated into at least one of the cuvette windows or sides and comprise a different material from the window or side to which the backstop is connected.

In example embodiments, the cuvette 10 may optionally further comprise a pedestal or protrusion 60 extending transversely from the interior surface of the bottom window 30, as shown in FIG. 3. The pedestal is configured to rest under the contact lens and displace at least some volume of solution required within the cuvette and under the lens. Pedestal 60 may be integrally fixed to the bottom window by optical contact bonding, laser welding, or other conventional methods of bonding. Preferably, pedestal 60 is located centrally within the optical zone and comprises a clear aperture for measurement between about 2-8 mm in diameter. While depicted embodiments provide a cylindrical pedestal, the pedestal may comprise other profiles, such as for example semi-circular or polygonal, or comprise chamfered sides.

The height of the pedestal 60 may vary depending on the dimensions of the lens to be measured. Preferably, the height of the pedestal is limited to be less than the vault or interior height of the contact lens to be tested in the cuvette, so as to prevent contact between the pedestal and the test lens to ensure no part of the test lens is unintentionally supported by the pedestal. According to example embodiments, pedestal 60 has a maximum height of about 3 mm for a conventional contact lens but the height may vary depending on the attributes of the lens to be measured. In example embodiments, the pedestal is made of sapphire, and in alternate embodiments the pedestal may be formed from other materials such as for example glass, fused silica, or other materials with thermal conductivities comparable to that of the solution displaced by the pedestal.

Figure 4:
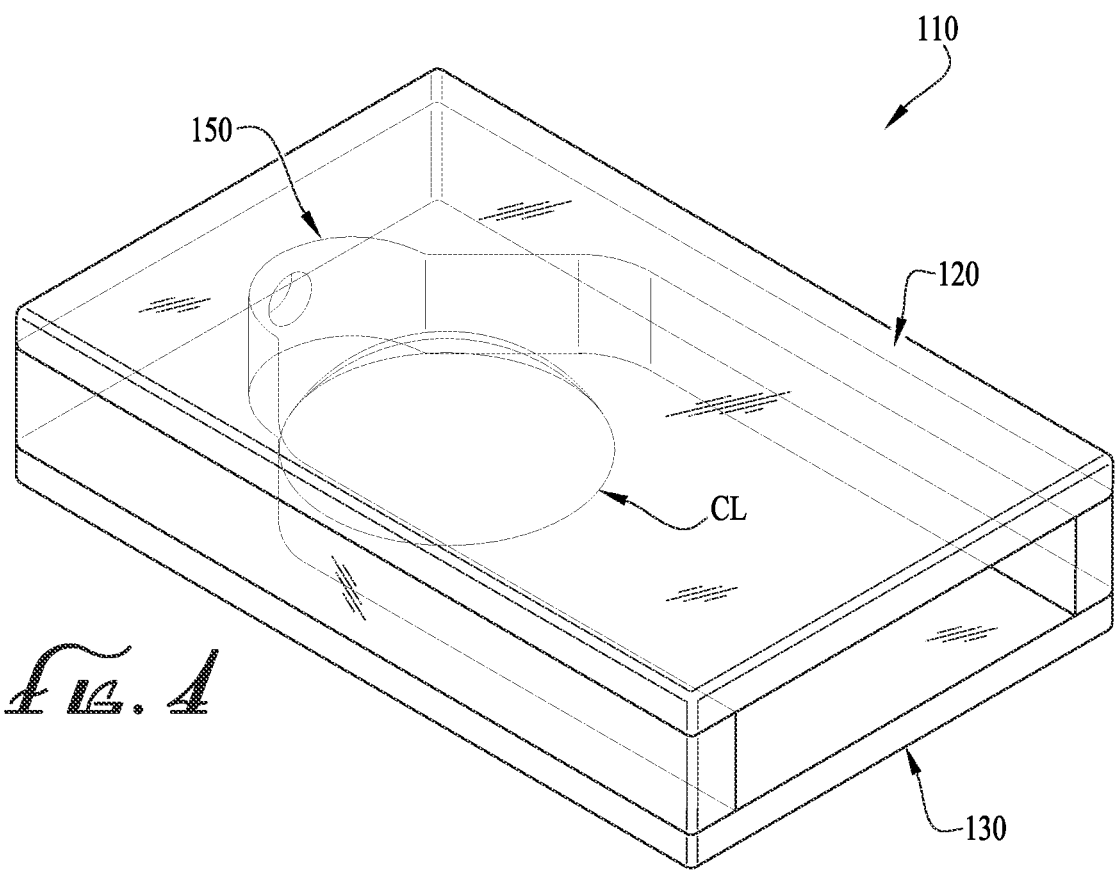
FIG. 4 is a perspective view of a cuvette according to another example embodiment of the present invention.

FIG. 4 shows a cuvette 110 according to another example embodiment of the present invention. Cuvette 110 includes a top window 120, a bottom window 130, and a midsection or body 150. According to example embodiments, at least one of the top and bottom windows 120, 130 is formed from a material with a thermal conductivity of at least 5 W/m-K and optical transparency of at least 85%. The midsection 150 is a unitary body with an integrated backstop made of an optical material, such as for example sapphire, glass, fused silica or other suitable optical materials that may be optically contacted and bonded to top and bottom windows. The top and/or bottom windows may incorporate optical zones with further requirements, such as for example exterior and interior surface parallelism, flatness and roughness, providing better conditions for more accurate measurements. According to example embodiments, optical zones of top and/or bottom windows require exterior and interior surface parallelism of no more than 10 arc-seconds, flatness of L/4-L/10 at 0.633 µm and peak-to-valley roughness of no more than 10 nm. Optical zones may encompass the entirety of the top and/or bottom windows or, alternatively, encompass only portions of the windows to be aligned with the contact lens during measurements. In other embodiments, the top window may be made from sapphire while the bottom window is made from another suitable material, such as glass or fused silica, or vice versa.

Figure 5:
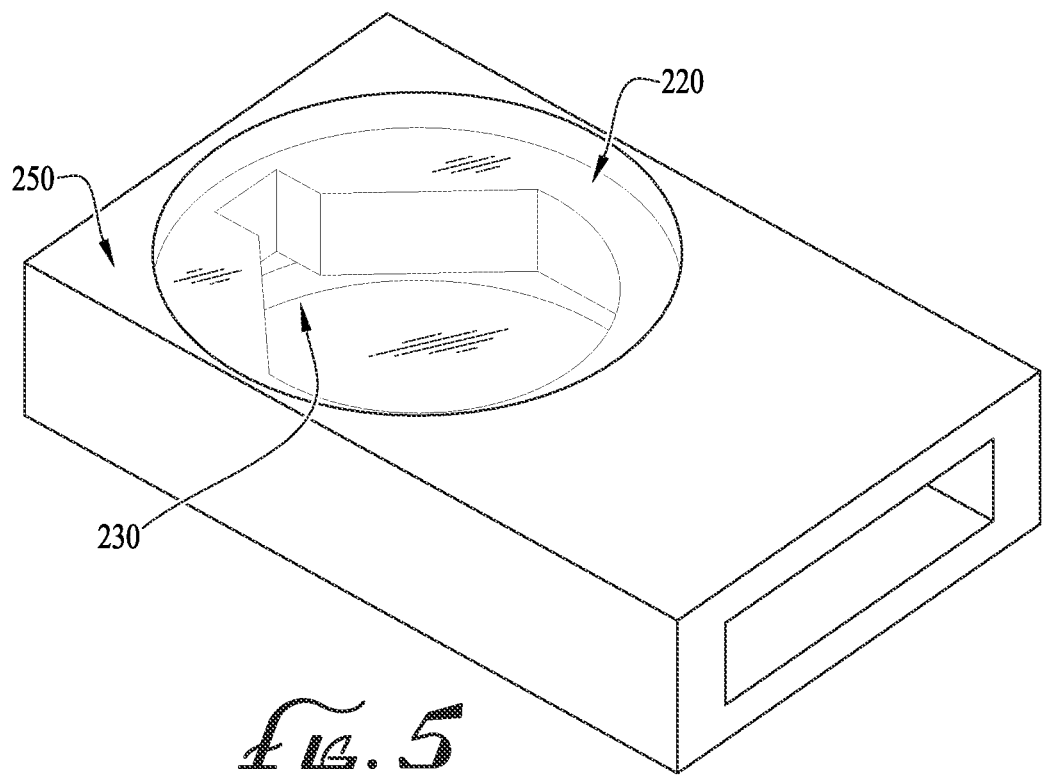
FIG. 5 is a perspective view of a cuvette according to yet another example embodiment of the present invention.

FIG. 5 shows a cuvette 210 according to yet another example embodiment of the present invention. Cuvette 210 comprises a unitary body or frame 250 with an integrated backstop. The unitary body or frame 250 includes an aperture or opening on the top and bottom sides configured to receive optically transparent or translucent windows 220 and 230. According to the depicted embodiment, round top and bottom windows 220, 230 are made of sapphire. The windows 220 and 230 are bonded to a unitary stainless-steel body 250 having a thermal conductivity of about 16.2 W/m-K. The windows 220 and 230 may be joined to the frame 250 by brazing or use of adhesives. Alternatively, the cuvette may comprise a frame with higher thermal conductivity, such as anodized aluminum, and windows with lower thermal conductivity, such as for example fused silica. In alternate embodiments, one or both of the windows 220, 230 may be circular, square, rectangular, polygonal or otherwise configured.

Figure 6:
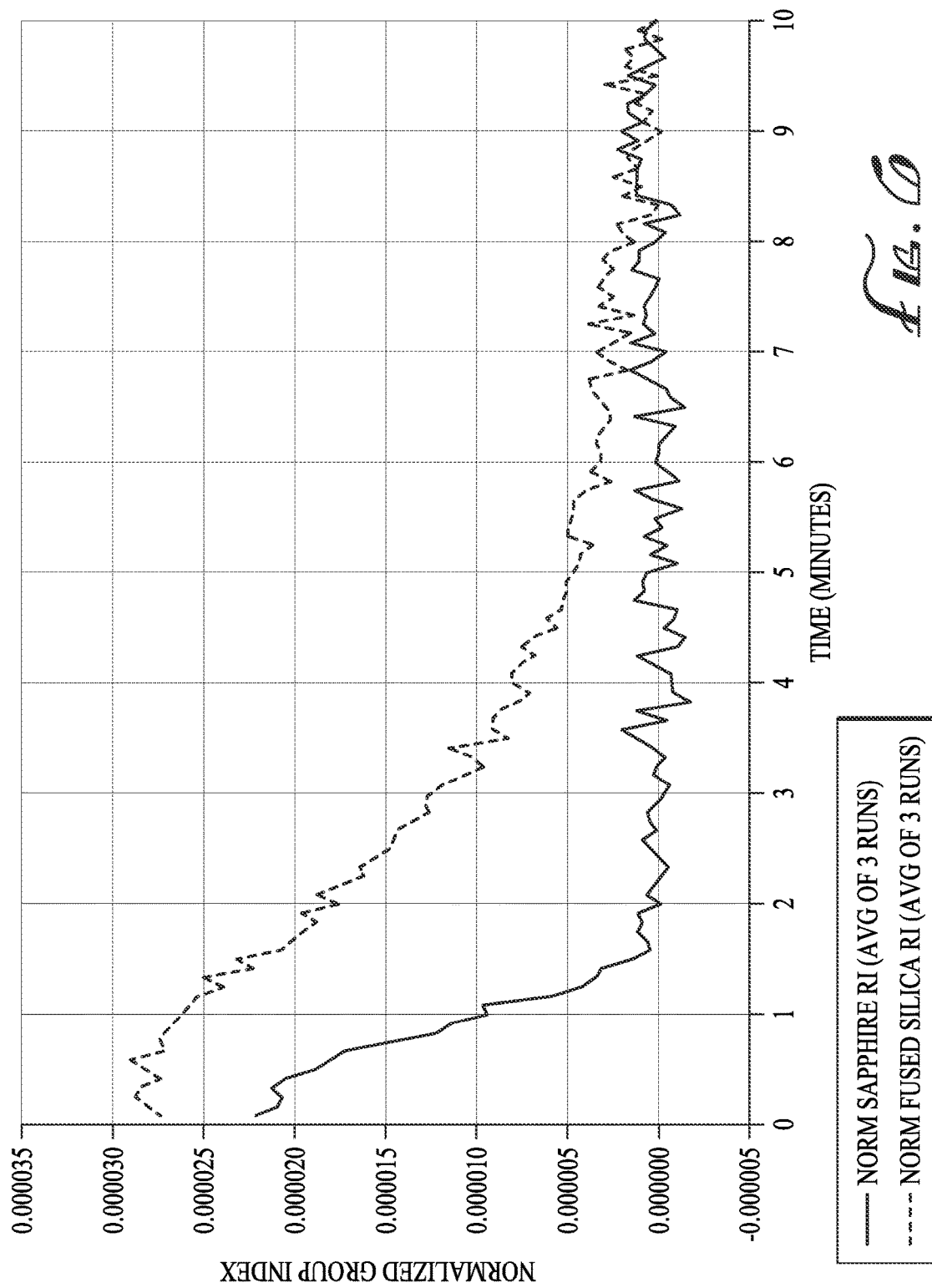
FIG. 6 shows a graph of the stabilization of deionized water and lens temperatures using a sapphire cuvette compared to a conventional fused silica cuvette.

Optical measurements have been conducted with example embodiments of a cuvette as depicted and described herein. The measurements have shown that stabilization of deionized water and lens temperatures using a sapphire cuvette occurs in less time over a 0.2° C. change compared to the stabilization time observed using a conventional cuvette having all sides made with fused silica. Whereas stabilization within the fused silica cuvette was observed over approximately eight minutes, stabilization within the sapphire cuvette was observed over approximately two minutes as shown in FIG. 6.

In an example mode or method of use, a cuvette according to the present disclosure is utilized to hold a contact lens and/or an intra-ocular lens (IOL) for, for example, in a test procedure measuring optical path distances (OPD) in a low coherence interferometer (LCI). The cuvette is constructed or assembled with at least one side made from a sapphire or other material having a thermal conductivity of at least 5 W/m-K to reduce the settling time of its contents. The cuvette is first filled with liquid solution, for example a saline water or other compatible composition. A contact lens is then inserted into the cuvette through an opening at its first end and placed abutting the backstop, if present, at its second end opposite the first end. The backstop may comprise symmetrically angled and centered surfaces which ensure proper and consistent positioning of the contact lens. To meet variability requirements and ensure accurate measurements, time is provided for the temperature of the solution and contact lens to stabilize or equilibrate before measurements are made. To further reduce the settling time, a pedestal may be provided under the contact lens to displace at least some volume of solution within the cuvette and reduce the overall amount of solution to be stabilized. In example embodiments, the settling or stabilization time for test processes utilizing a cuvette according to the present disclosure is substantially reduced, for example by at least 20%, or in other examples by at least about 30%, 40% or 50%, compared to test processes utilizing conventional cuvettes.

Once stabilized, the cuvette is aligned with the LCI probe and light beam output from the probe is passed through the optical zone of the top window and the center of the contact lens. As shown in FIG. 3, the light beam LB passes through the media interfaces A, B, C, D, and E, where A represents the interface between the environment and the top exterior surface of the top window, B represents the interface between solution and interior surface of the top window, C represents the interface between solution and top surface of contact lens, D represents the interface between solution and bottom surface of the contact lens and E represents the interface between solution and top surface of the pedestal. The probe detects light reflected back from the interfaces and the corresponding individual peaks. The OPDs are calculated as the distances among the peaks.

While the invention has been described with reference to example embodiments, it will be understood by those skilled in the art that a variety of modifications, additions and deletions are within the scope of the invention, as defined by the following claims.

What is claimed is:

1. A cuvette for holding a lens during optical measurements and testing, the cuvette comprising:
   a top window, a bottom window, a first side wall, a second side wall, and a third side wall defining an interior chamber for receiving a lens, wherein at least one of the windows is made from an optically clear material with a thermal conductivity of at least 5 W/m-K,
   wherein the top window comprises an optical zone exterior and interior surface parallelism of no more than 10 arc-seconds, flatness of L/4-L/10 at 0.633 µm and peak-to-valley roughness of no more than 10 nm.

2. The cuvette of claim 1, wherein the at least one window with thermal conductivity of at least 5 W/m-K comprises a sapphire material.

3. The cuvette of claim 1, wherein at least one of the side walls is made from an optically clear material with a thermal conductivity of at least 5 W/m-K.

4. The cuvette of claim 3, wherein the at least one side wall made from an optically clear material with a thermal conductivity of at least 5 W/m-K is made from sapphire.

5. A cuvette for optical analyses of a lens, comprising:
   a top window and a bottom window, wherein at least one of the windows is made of an optically clear material with a thermal conductivity of at least 5 W/m-K and at least 85% transparency,
   wherein the top window comprises an optical zone exterior and interior surface parallelism of no more than 10 arc-seconds, flatness of L/4-L/10 at 0.633 µm and peak-to-valley roughness of no more than 10 nm.

6. The cuvette of claim 5, wherein at least one of the windows is made of an optically clear material with a thermal conductivity between 5 W/m-K and 42 W/m-K and at least 85% transparency at about 0.5-2 µm wavelengths.

7. The cuvette of claim 5, wherein at least one of the windows comprises sapphire.

8. The cuvette of claim 5, further comprising a first side wall, a second side wall, and a third side wall.

9. The cuvette of claim 5, further comprising a backstop for consistent placement of the lens during optical measurements.

10. The cuvette of claim 5, further comprising a pedestal fixed to the bottom window.

11. The cuvette of claim 10, wherein the pedestal is made from a material with at least 5 W/m-K of thermal conductivity.

12. A cuvette for holding a lens for optical measurements, comprising:
- a top window insert,
- a bottom window insert, and
- a unitary body frame having a top surface and a bottom surface, wherein the unitary body frame comprises a first opening on the top surface configured for receiving the top window insert and a second opening on the bottom surface configured for receiving the bottom window insert,
- wherein the top and bottom window inserts are made from an optically clear material, and
- wherein the unitary frame body is made of an optically opaque material with at least 5 W/m-K of thermal conductivity, wherein the top window insert comprises an optical zone exterior and interior surface parallelism of no more than 10 arc-seconds, flatness of L/4-L/10 at 0.633 μm and peak-to-valley roughness of no more than 10 nm.

13. The cuvette of claim 12, wherein the optically opaque material for the unitary frame body is stainless steel.

14. The cuvette of claim 12, wherein the optically opaque material for the unitary frame body is anodized aluminum.

\* \* \* \* \*